US007792175B2

(12) United States Patent
Bernstein

(10) Patent No.: US 7,792,175 B2
(45) Date of Patent: Sep. 7, 2010

(54) TRIPLET QUENCHER FOR USE IN LASERS

(76) Inventor: Eric F. Bernstein, 221 Righters Mill Rd., Gladwyne, PA (US) 19035

( * ) Notice: Subject to any disclaimer, the term of this patent is extended or adjusted under 35 U.S.C. 154(b) by 277 days.

(21) Appl. No.: 12/056,358

(22) Filed: Mar. 27, 2008

(65) Prior Publication Data

US 2008/0298421 A1     Dec. 4, 2008

Related U.S. Application Data

(60) Provisional application No. 60/907,270, filed on Mar. 27, 2007.

(51) Int. Cl.
    *H01S 3/20*     (2006.01)
    *G03G 5/00*     (2006.01)
(52) U.S. Cl. .......................... 372/53; 430/82
(58) Field of Classification Search ............. 372/53; 430/82
See application file for complete search history.

(56) References Cited

U.S. PATENT DOCUMENTS

2001/0043635 A1    11/2001    Furumoto et al.

FOREIGN PATENT DOCUMENTS

EP     0 313 941 A1     3/1989
JP     7-89879     4/1995
WO     WO 95/04393     2/1995

OTHER PUBLICATIONS

Winter et al, "Electron Transfer Quenching of dye triplets by NO2 and N3," Aug. 1, 1981, CHemical Physics Letters, vol. 81, No. 3, pp. 547-552.*
Winter et al.; "Electron Transfer Quenching of Dye Triplets by No2 and N3. A Spin-Orbit Coupling Effect on the Radical Yield" *Chemical Physics Letters*, vol. 81, No. 3 (1981).
Liphardt et al.; "Laser Dyes with Intramolecular Triplet Quenching" *Optics Communications*, vol. 38, No. 3 (1981).
Ahmad et al.; "Singlet Oxygen and Dye-triplet-state Quenching in Solid-state Dye Laser Consisting of Pyrromethene 567-doped Poly(methyl methacrylate)" *Applied Optics*, vol. 38, No. 30 (1999).

\* cited by examiner

*Primary Examiner*—Minsun Harvey
*Assistant Examiner*—Patrick Stafford
(74) *Attorney, Agent, or Firm*—Davidson Berquist Jackson & Gowdey LLP

(57) ABSTRACT

There are disclosed compounds for assisting triplet absorption in a laser, such as a pulsed-dye laser, the compounds comprising at least one molecule chosen from nitroxides and nitrones. In one embodiment, the disclosed compounds may be mixed with the dye of a dye laser in an amount sufficient to assist in triplet absorption. In one embodiment, the nitroxide compound comprises tempol[4-hydroxy-2,2,6,6-tetramethyl-piperidinyloxy, free radical]. Also disclosed are methods of using the disclosed compounds to control the triplet absorption of a dye laser or improve the performance or life span of a gaseous or solid laser.

26 Claims, No Drawings

TRIPLET QUENCHER FOR USE IN LASERS

This application claims the benefit of domestic priority to U.S. Provisional Patent Application No. 60/907,270, filed Mar. 27, 2007, which is herein incorporated by reference in its entirety.

The present disclosure is related to triplet quenchers for lasers including liquid medium lasers such as dye lasers, and solid medium lasers and gas lasers.

Lasers typically have problems with triplet absorption. As one skilled in the art would appreciate, when atoms are in the triplet state for too long, they are not available for lasing, thus triplet quenchers prevent a loss in efficiency due to too many atoms being in the triplet state. For example, dye lasers lose their efficiency when they lose synchronicity between the pump pulse and laser pulse due to triplet absorption. To address this problem, one needs to control the triplet state population. For example, the addition of a molecule that acts as a triplet quencher, in addition to the dye molecule in the dye solution, can help solve the problem of triplet absorption. Accordingly, in an attempt to fix this problem, triplet quenchers have been used to control the triplet state population. A number of compounds have been found to have the right energy levels to behave as triplet quenchers. For example, the compound cyclooctatetraene (COT) is used as a triplet quencher for rhodamine dyes, such as rhodamine 6G.

Other strategies to control the triplet population in a dye laser involve moving the dye very rapidly through the dye cavity where light from a pumping source, such as a flashlamp or argon laser, is shined.

The most common triplet quencher currently used in pulsed-dye lasers, which have their largest use in dermatology, is cyclooctatetraene (COT). A problem with this compound, however, is that it is volatile and emits an odor when lasers are being installed and serviced. In addition, because this is a volatile compound, it must be shipped as a hazardous material.

Accordingly, there is need for a triplet quencher that is water soluble or at least non-volatile. Such a quencher would solve the problem of odor emission and could be solublized in the dye eliminating the need for hazardous material shipping. In addition, a non-volatile or water soluble quencher may be able to be shipped already solublized in the dye and not require separate shipping.

To avoid the problems associated with currently used triplet quenchers, such as cyclooctatetraene (COT), the present disclosure is directed to triplet quenchers for lasers comprising nitroxides and/or nitrones.

From their early chemistry until the present time, nitrones have been largely employed in Organic Chemistry. The importance of the nitrone functionality has been revealed by the growing number of scientific papers which appeared in the literature over the last few years concerning nitrones and related compounds. Most of the work based on the nitrone functional group is related to the field of the Organic Synthesis (both concerning cycloaddition reactions and nucleophilic additions). A comprehensive review of nitrone synthesis is provided in *Science of Synthesis*, 2004, Vol. 27. p. 511, which is herein incorporated by reference.

As a general topic, the chemistry of nitrones has been described in the past, including cycloaddition chemistry, and a more detailed description of the nitrone functionality in various volumes in the Patai series. *The Chemistry of Carbon-Nitrogen Double Bond* Patai, S. (Ed.), John Wiley & sons, New York, 1969. (b) *The Chemistry of double bonded functional groups*, Patai, S. (Ed.), John Wiley & sons, New York, 1977, Supplement A. (c) Breuer, E. *Nitrones and nitronic acid derivatives: an update* In *Nitrones, Nitronates and Nitroxides*, Patai, S.; Rappoport, Z. (Eds.), John Wiley & sons, New York, 1989, Supplement U2, Chapter 3, pp. 245-312, all of which are herein incorporated by reference.

Nitrones are easily prepared by several methods well-documented in the primary literature, such as in Franco, S.; Merchan, F. L.; Merino, P. Tejero, T. *Synth. Commun.* 1995, 25, 2275-2284 (b) Dondoni, A.; Franco, S.; Junquera, F.; Merchan, F. L.; Merino, P. Tejero, T. *Synth. Commun.* 1994, 25, 2537-2550, which is herein incorporated by reference. This reference, which is herein incorporated by reference, describes the often used condensation reactions between carbonyl compounds and oxidation of amines, imines or hydroxylamines. See, also, Murahashi, S. I. *Angew. Chem. Int Ed. Engl.* 1995, 34, 2443-2465. (b) Murahashi, S. I.; Mitsui, H.; Shiota, T.; Tsuda, T.; Watanabe, S. *J. Org. Chem.* 1990, 55, 1736-1744.

Nitroxide and nitrone compounds have been shown to have significant free-radical scavenging abilities. These agents have been shown to prevent oxidative damage in a number of systems and have been used to preserve a number of materials including paints and rubber. Many nitroxides and nitrone compounds have anti-oxidant properties, and may function as triplet quenchers in dye lasers. Tempol[4-hydroxy-2,2,6,6-tetramethyl-piperidinyloxy, free radical] is an example of a nitroxide that could be used in laser dye or in laser rods or laser gas.

Other non-limiting examples of compounds that could be used according to the present disclosure include water soluble, anti-oxidants, such as glutathione and its derivatives, and n-acetyl compounds, such as n-acetyl cysteine.

Non-limiting examples of such water soluble anti-oxidants include vitamin c, citric acid, reduced glutathione and related compounds, including those previously mentioned, e.g., n-acetyl cystein and other n-acetyl compounds.

In addition, superoxide dismutase, poly-hydroxy acids, such as lactobionic acid and gluconolactone, may also be used as water soluble anti-oxidants.

Also, it is possible to use fat soluble antioxidants, such as vitamin e and its derivatives, and vitamin a, as well as lycopene.

The present disclosure is also directed to a method of using triplet quenchers that are non-volatile and possibly water soluble. Non-limiting examples of water soluble triplet quenchers that may be used include tempol 4-hydroxy-2,2,6,6-tetramethyl-piperidinyloxy] and tempo.

In addition, triplet quenchers that are volatile or non-volatile may be used if they augment the benefits of cyclooctatetraene (COT) or provide some benefits over or in addition to cyclooctatetraene (COT).

Accordingly, there is disclosed a compound for assisting triplet absorption in a pulsed-dye laser, the compound comprising nitroxides or nitrones.

In this embodiment, the nitroxide or nitrone compounds are mixed with the dye of the pulsed-dye laser in an amount sufficient to assist in triplet absorption. It is appreciated that the nitroxide or nitrone compounds can be used to augment the effectiveness of cyclooctatetraene (COT), the main triplet quencher used in pulsed-dye lasers.

In one embodiment, the nitroxide comprises tempol[4-hydroxy-2,2,6,6-tetramethyl-piperidinyloxy, free radical].

In another embodiment, the dye that is mixed with the nitroxide or nitrone compound may be chosen from rhodamine and its derivatives, including but not limited to rhodamine-6G.

In addition to acting as a triplet quencher, the disclosed compounds can be used to generally improve the performance and life span of a laser to which they are added. Thus, the disclosed compounds can be used to improve the performance or life span of a solid or gas laser.

In another embodiment there is disclosed a method of controlling the triplet state population of a dye laser, the method comprising adding at least one nitroxide or nitrone to the dye of a dye laser.

As previously stated, this method may comprise adding a nitroxide, such as tempol[4-hydroxy-2,2,6,6-tetramethyl-piperidinyloxy, free radical] to the dye.

In other embodiments, there is disclosed a method of improving the performance or life span of any laser by adding the described nitroxide or nitrone to the active component of the particular laser. For example, when used in a solid or gas laser, the disclosed methods may comprise adding at least one nitroxide or nitrone to the gas of a gas laser, the rods of a solid-state laser, or the chemical of a chemical laser.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A compound for assisting triplet absorption in a dye laser, said compound comprising at least one molecule chosen from nitroxides and nitrones, wherein said molecule is a nitroxide and comprises tempol[4-hydroxy-2,2,6,6-tetramethyl-piperidinyloxy, free radical].

2. A compound for assisting triplet absorption in a dye laser, said compound comprising at least one molecule chosen from nitroxides and nitrones, and further comprising at least one water soluble anti-oxidant.

3. The compound of claim 2, wherein said water soluble anti-oxidant is chosen from glutathione, n-acetyl compounds, vitamin c, citric acid, superoxide dismutase, poly-hydroxy acids, and derivatives thereof.

4. The compound of claim 3, wherein said poly-hydroxy acids are chosen from lactobionic acid and gluconolactone.

5. A compound for assisting triplet absorption in a dye laser, said compound comprising at least one molecule chosen from nitroxides and nitrones, and further comprising at least one fat soluble antioxidant.

6. The compound of claim 5, wherein said at least one fat soluble antioxidant is chosen from vitamin e, vitamin a, lycopene and derivatives thereof.

7. A compound for assisting triplet absorption in a dye laser, said compound comprising at least one molecule chosen from nitroxides and nitrones, wherein said dye comprises rhodamine.

8. The compound of claim 7, wherein said dye comprises rhodamine 6G.

9. A compound for improving the performance or life span of a solid, solid-state, liquid or gas laser, said compound comprising at least one molecule chosen from nitroxides and nitrones, wherein said nitroxide comprises tempol[4-hydroxy-2,2,6,6-tetramethyl-piperidinyloxy, free radical].

10. A compound for improving the performance or life span of a solid, solid-state, liquid or gas laser, said compound comprising at least one molecule chosen from nitroxides and nitrones, and further comprising a water soluble antioxidants chosen from glutathione, n-acetyl compounds, vitamin c, citric acid, superoxide dismutase, poly-hydroxy acids, and derivatives thereof.

11. The compound of claim 10, wherein said poly-hydroxy acids are chosen from lactobionic acid and gluconolactone.

12. A compound for improving the performance or life span of a solid, solid-state, liquid or gas laser, said compound comprising at least one molecule chosen from nitroxides and nitrones, and further comprising at least one fat soluble antioxidants.

13. The compound of claim 12, wherein said at least one fat soluble compound is chosen from vitamin e, vitamin a, lycopene and derivatives thereof.

14. A method of controlling the triplet state population of a dye laser, said method comprising adding at least one molecule chosen from nitroxide and nitrone to the dye of a dye laser, wherein said nitroxide comprises tempol[4-hydroxy-2,2,6,6-tetramethyl-piperidinyloxy, free radical].

15. A method of controlling the triplet state population of a dye laser, said method comprising adding at least one molecule chosen from nitroxide and nitrone to the dye of a dye laser, wherein said dye comprises rhodium.

16. A method of controlling the triplet state population of a dye laser, said method comprising adding at least one molecule chosen from nitroxide and nitrone to the dye of a dye laser, and further comprising adding at least one water soluble anti-oxidant to said dye.

17. The method of claim 16, wherein said water soluble anti-oxidant is chosen from glutathione, n-acetyl compounds, vitamin c, citric acid, superoxide dismutase, poly-hydroxy acids, and derivatives thereof.

18. The method of claim 17, wherein said poly-hydroxy acids are chosen from lactobionic acid and gluconolactone.

19. A method of controlling the triplet state population of a dye laser, said method comprising adding at least one molecule chosen from nitroxide and nitrone to the dye of a dye laser, and further comprising at least one fat soluble antioxidant.

20. The method of claim 19, wherein said fat soluble compound is chosen from vitamin e, vitamin a, lycopene and derivatives thereof.

21. A method of improving the lifespan of a laser, said method comprising adding at least one molecule chosen from nitroxides and nitrones to the gas of a gas laser or to the rods of a solid laser, wherein said nitroxides comprise tempol[4-hydroxy-2,2,6,6-tetramethyl-piperidinyloxy, free radical].

22. A method of improving the lifespan of a laser, said method comprising adding at least one molecule chosen from nitroxides and nitrones to the gas of a gas laser or to the rods of a solid laser, and further comprising adding at least one water soluble anti-oxidant to said dye.

23. The method of claim 22, wherein said water soluble anti-oxidant is chosen from glutathione, n-acetyl compounds, vitamin c, citric acid, superoxide dismutase, poly-hydroxy acids, and derivatives thereof.

24. The method of claim 23, wherein said poly-hydroxy acids are chosen from lactobionic acid and gluconolactone.

25. The method of claim 22, further comprising at least one fat soluble antioxidant.

26. The method of claim 25, wherein said at least one fat soluble compound is chosen from vitamin e, vitamin a, lycopene and derivatives thereof.

* * * * *